US008823238B2

(12) United States Patent
Greaves et al.

(10) Patent No.: US 8,823,238 B2
(45) Date of Patent: Sep. 2, 2014

(54) WINDING ARRANGEMENT FOR AN ELECTRICAL MACHINE

(75) Inventors: Matthew Greaves, Corinda (AU); Ben Guymer, Draper (AU); Bernie Walsh, Coorparoo (AU)

(73) Assignee: Hybridauto Pty Ltd (AU)

( * ) Notice: Subject to any disclaimer, the term of this patent is extended or adjusted under 35 U.S.C. 154(b) by 679 days.

(21) Appl. No.: 12/593,630

(22) PCT Filed: Apr. 1, 2008

(86) PCT No.: PCT/AU2008/000451
§ 371 (c)(1),
(2), (4) Date: Oct. 6, 2009

(87) PCT Pub. No.: WO2008/119120
PCT Pub. Date: Oct. 9, 2008

(65) Prior Publication Data
US 2010/0117481 A1  May 13, 2010

(30) Foreign Application Priority Data
Apr. 3, 2007 (AU) ................................ 2007901786

(51) Int. Cl.
*H02K 3/47* (2006.01)
*H02K 3/04* (2006.01)

(52) U.S. Cl.
USPC ........................... 310/207; 310/208; 310/268

(58) Field of Classification Search
USPC ............. 310/156.32, 156.35, 156.34, 156.36, 310/156.37, 184, 207–208, 268
See application file for complete search history.

(56) References Cited

U.S. PATENT DOCUMENTS

| | | | | |
|---|---|---|---|---|
| 3,906,622 A * | 9/1975 | Sakano et al. | ................... | 29/597 |
| 4,028,572 A | 6/1977 | Baltisberger | | |
| 4,549,042 A * | 10/1985 | Akiba et al. | ............... | 174/114 R |
| 5,319,844 A | 6/1994 | Huang et al. | | |
| 5,616,977 A * | 4/1997 | Hill | ................................ | 310/179 |
| 5,744,896 A * | 4/1998 | Kessinger et al. | ............ | 310/268 |
| 6,649,844 B2 | 11/2003 | Kusumoto et al. | | |
| 6,703,750 B2 * | 3/2004 | Nakamura | ..................... | 310/184 |
| 6,806,612 B2 * | 10/2004 | Nakamura et al. | ............ | 310/208 |
| 7,671,504 B2 * | 3/2010 | Rohrer et al. | ................. | 310/208 |
| 2002/0096959 A1 * | 7/2002 | Qin et al. | ....................... | 310/208 |
| 2006/0082239 A1 * | 4/2006 | Rajasingham | ................ | 310/208 |
| 2009/0200889 A1 * | 8/2009 | Halstead | ....................... | 310/208 |

FOREIGN PATENT DOCUMENTS

DE 19939894 3/2000
WO WO2007080337 A1 7/2007

OTHER PUBLICATIONS

"Design of an in-wheel motor for a solar-powered electric vehicle"—Lovatt et al. EMD97 Sep. 1-3, 1997 Conference Publn No. 444 P234 IEEE.
"Optimal Design of a Coreless Stator axial Flux Permanent-Magnet Generator" Wang et al IEEE Transaction on magnets vol. 41 P55 No. 1 Jan. 2005.

* cited by examiner

*Primary Examiner* — Burton Mullins
(74) *Attorney, Agent, or Firm* — Daniel Schein, Esq.

(57) ABSTRACT

A design for and method of winding an electric motor, generator or other electrical machine using multiple strands of wire preformed into a wave shape with a plurality of legs connected by shaped end turns. This results in efficient packing and improved machine performance in terms of both efficiency and power density without the need for flux concentrators. The conductors or windings may be preformed so as to be a self supporting structure, aiding assembly and eliminating the need for an iron core.

11 Claims, 18 Drawing Sheets

WINDING ARRANGEMENT FOR AN ELECTRICAL MACHINE

TECHNICAL FIELD

The present invention relates to windings for electrical machines, and in particular to a wave winding arrangement and a method of manufacture thereof.

BACKGROUND

Electrical machines can be categorized as motors or generators. The construction of electrical motors and generators is similar with many electrical machines being able to operate as both a motor and a generator.

Permanent magnet electrical machines have a winding that moves relative to the magnets. There are many different configurations of permanent magnet electrical machines. The winding may be part of the stator of the machine with the magnets attached to the rotor, or the winding may be part of the rotor with the magnets attached to the stator. Permanent magnet electrical machines may be brushed or brushless.

The geometry of an electrical machine can be categorized by the direction of the flux that the winding is exposed to. Axial flux machines have a disc shaped winding exposed to a magnetic flux that flows substantially parallel to the axis of rotation of the machine. The axial flux may be provided by two disc shaped sets of magnets with the winding positioned in the gap between the magnet sets. One of the sets of magnets may be replaced with iron only, to provide a return path for the magnetic field. In some applications there may be only one set of magnets without any iron on the other side of the winding. Radial flux machines have a cylindrically shaped winding exposed to a radially directed magnetic flux, which may be provided by two cylindrical sets of magnets, one cylindrical set of magnets and an iron cylinder to provide a return path for the magnetic field, or one cylindrical set of magnets alone. Similarly, conical flux machines have a conically shaped winding with magnets providing flux normal to the surface of the conical shaped winding. Linear electrical machines have a flat rectangular shaped winding that moves linearly relative to one or two rectangular sets of magnets that provide flux normal to the rectangular shaped winding.

The winding of a traditional electrical machine has conductors wound onto a laminated iron core. The iron core is primarily used to reduce the reluctance of the magnetic circuit, but it serves a secondary purpose of providing a supporting structure and thermal path for heat generated in the winding.

Ironless machines have windings without any ferromagnetic material. When optimised, an ironless machine can have extremely low spinning losses, no cogging torque, high peak torque and minimal torque ripple. Ironless machines find applications in servo drives, hard disk drives and have significant potential for use in vehicle drives or other applications that require low spinning losses and high transient torque. With the introduction of high energy rare earth permanent magnets, the ability to produce high performance ironless machines became a reality.

In order to obtain the maximum performance from an ironless machine, it is necessary to maximise the amount of conducting material, typically copper, in the winding. This is referred to as the "fill factor". An electric machine has an active volume that is dedicated to be filled by the active portions of the winding conductors. In an axial flux ironless machine with two sets of magnets, this active volume is the volume between the faces of the two sets of magnets. The fill factor is defined as the proportion of the active volume taken up by conducting material.

In ironless machines, the conductors in the winding are exposed to the full magnetic field and so to avoid excessive eddy currents in the winding the conductors are typically made from fine strands of insulated copper wire. However, reducing the copper wire diameter to reduce eddy currents also makes it difficult to manufacture a winding with a high fill factor because of the thickness of the insulation on the wire and the gaps between the wire strands. Machines with poor fill factor require large magnetic content to achieve acceptable performance, and machines with poor fill factor typically suffer from poor thermal conductivity due to the excessive quantity of resin required to construct the winding.

"Litz wire" is a conductor made from a bundle or bundles of strands of fine copper wire. The wire strands have a thin film of insulation, and the entire bundle is surrounded by an insulating layer made from textile yarn, tape or other materials. Litz wire has several configurations, known as "types". Type-1 Litz wire is comprised of a single bundle of strands of copper wire twisted together within the outer insulating layer. Type-2 Litz wire is comprised of multiple sub-bundles of strands of copper wire. The strands of each sub-bundle are twisted together, like Type-1 Litz wire, and the sub-bundles themselves are then twisted together within the outer insulating layer. Type-2 Litz wire does not have any additional insulating layers surrounding the sub-bundles. Type-3 Litz wire is also comprised of multiple sub-bundles of strands of copper wire twisted together within the outer insulating layer but unlike Type-2 Litz wire, each sub-bundle has its own outer insulating layer. The sub-bundles of Type-3 Litz wire may comprise a single twist of strands, like Type-1 Litz wire, or multiple twists of strands like Type-2 Litz wire. As supplied, Litz wire is flexible.

Windings for ironless machines using conductors made from Type-1 or Type-2 Litz wire are known, but use of Type-3 Litz wire is not known. The paper titled "Design of an in-wheel motor for a solar-powered electric vehicle" by V. S. Ramsden, B. C. Mecrow and H. C. Lovatt, published in the IEE Proceedings, "Electric Power Applications", 1998, 145, No 5, 402-408, discloses an ironless direct drive wheel motor with a winding made from Type-2 Litz wire. International Patent Publication WO 2004/010561 A1 (Hamilton Sundstrand) also discloses the use of Litz wire to make a winding for an electric machine, and shows an example using Type-2 Litz wire.

Many methods of manufacturing windings for ironless machines have been proposed or used. U.S. Pat. No. 5,744,896 (Kessinger et al) discloses a method of manufacturing a winding for an ironless machine in which the winding is made up of a large number of individually wound coils of wire strands. The coils are assembled in a mould and wired together. The disadvantages of this method are that each coil must be individually electrically connected and small variations between each coil affect the overall performance of the machine.

An alternative to individually wound coils is to arrange the conductors of the winding into a wave pattern. The conductors of a wave pattern winding are wave shaped, meaning that each conductor progresses around the winding, periodically crossing the magnetic field, without looping back on itself. Each wave shaped conductor has a plurality of legs that are the active part of the conductor directly exposed to the magnetic field and end turns that connect the legs. It is desirable to minimise the length of the end turns in order to minimise resistance losses in the machine, and to minimise the weight and size of the winding. Compact end turns can be difficult to achieve in a multiphase wave pattern winding because the end turns overlap each other.

Some wave pattern windings have two layers, with the legs of each conductor alternating between the two layers. U.S. Pat. No. 5,319,844 (Huang et al) discloses a radial air gap motor having a two layer wave pattern winding. However, this motor has flux concentrators positioned in the gaps between the legs of the wave shaped conductors, rather than being a purely ironless motor.

The winding of the motor disclosed in the above referenced paper "Design of an in-wheel motor for a solar-powered electric vehicle" is manufactured by arranging Litz wire into a two layer wave pattern then bonding the Litz wire with resin in a mould to form a rigid structure. The wave pattern is formed by winding the Litz wire directly in the mould, or winding the Litz wire onto a temporary former, such as a board with pegs, then transferring the wave pattern into the mould. Whilst this method of manufacturing a winding is well suited to light weight solar-powered vehicles, a winding having a higher copper fill factor than this prior art method provides is desirable for higher power applications.

U.S. Pat. No. 6,649,844 (Kusumtoto et al) discloses a method of preforming a wave shaped conductor from a bundle of strands of copper wire. The end turns of the wave shaped conductors disclosed in this patent are straight and lie in the plane of the wave shape, resulting in a square wave shaped conductor. These square wave shaped conductors are arranged into a wave pattern with large gaps between adjacent conductor legs. This method of forming a wave pattern winding is directed to electric machines having an iron core to fill the large gaps between the conductor legs of the winding. However, this method is not well suited to manufacturing ironless wave pattern windings because the square wave shaped conductors result in an inefficient packing of the end turns once the gap between the legs of the conductors is reduced, as is necessary for an efficient ironless winding arrangement.

It is an object of the present invention to provide an improved winding arrangement for an electric machine.

SUMMARY OF INVENTION

In a first aspect, the present invention consists of a winding for an electrical machine, comprising at least one conductor, the conductor comprising multiple strands of wire and an outer insulating layer, and having a wave shape comprising a plurality of legs connected by end turns, with at least a portion of at least one end turn following a curved path, characterised in that the cross section of the end turn at least one point on the curved path, viewed normal to the curved path, is thicker in a radial direction than an axial direction, the radial and axial directions being with respect to the instantaneous centre of curvature of the curved path at the point.

In a second aspect, the present invention consists of a preformed conductor for use in the manufacture of a winding for an electrical machine, the conductor comprising multiple strands of wire and an outer insulating layer, the conductor having a self supporting wave shape comprising a plurality of legs connected by end turns, characterised in that at least a portion of a least one end turn follows a curved path.

In a third aspect, the present invention consists of a method of manufacturing a winding for an electrical machine, the winding comprising at least two conductors arranged into a wave pattern, each conductor comprising multiple strands of wire and an outer insulating layer, the method comprising preforming the conductors such that they each have a self supporting wave shape, the wave shape comprising a plurality of legs connected by end turns, characterised in that the method further comprises weaving the preformed conductors together to form the wave pattern.

In a fourth aspect, the present invention consists of a method of manufacturing an ironless winding for an electrical machine, comprising arranging at least one conductor, having multiple strands of wire and an outer insulating layer, into a wave pattern then bonding the wave pattern to form a rigid structure, characterised in that, prior to arranging the wave pattern, each conductor is preformed, from a flexible state, such that each preformed conductor has a self supporting wave shape.

Some further variations of the invention are defined in the Claims.

DESCRIPTION OF THE PREFERRED EMBODIMENT OF THE INVENTION

The present invention will be described in detail primarily as applied to axial flux motors but the method of manufacturing the winding described, and the resulting winding arrangement, is equally applicable to other configurations of electrical machines, such as radial or conical flux machines, generators, and linear machines, regardless of whether the winding forms the stator or the rotor, or the machine has brushes or is brushless.

Figure 1:
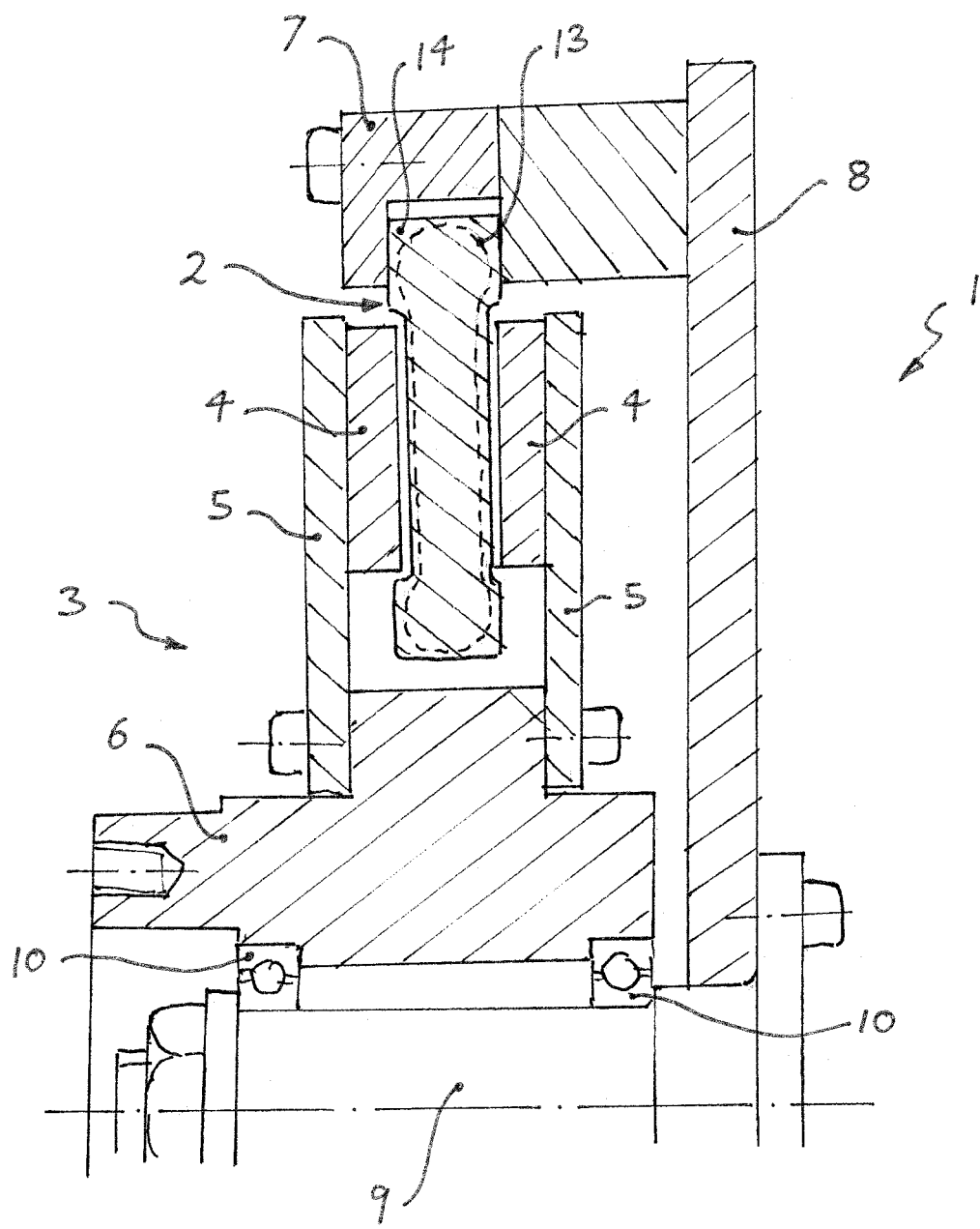
FIG. 1 is a cross sectional view of an axial flux electric motor, having an ironless stator winding, in accordance with the present invention, manufactured by a method in accordance with the present invention.

Referring to FIG. 1, axial flux electric motor 1 comprises a disc shaped ironless stator 2 positioned between two disc shaped sets of permanent magnets 4 that are mounted on backing plates 5. Backing plates 5 are attached to a hub 6 that is supported for rotation around stub axle 9 by bearings 10. Magnets 4, backing plates 5 and hub 6 make up the rotor 3 of motor 1. The stub axle 9 is attached to the motor housing 8, and the stator 2 is attached to the housing 8 by a clamp plate 7. Motor 1 can be used as a direct drive wheel motor for a vehicle by attaching the motor housing 8 to the suspension of the vehicle, and mounting a wheel onto the motor hub 6.

Figure 2:
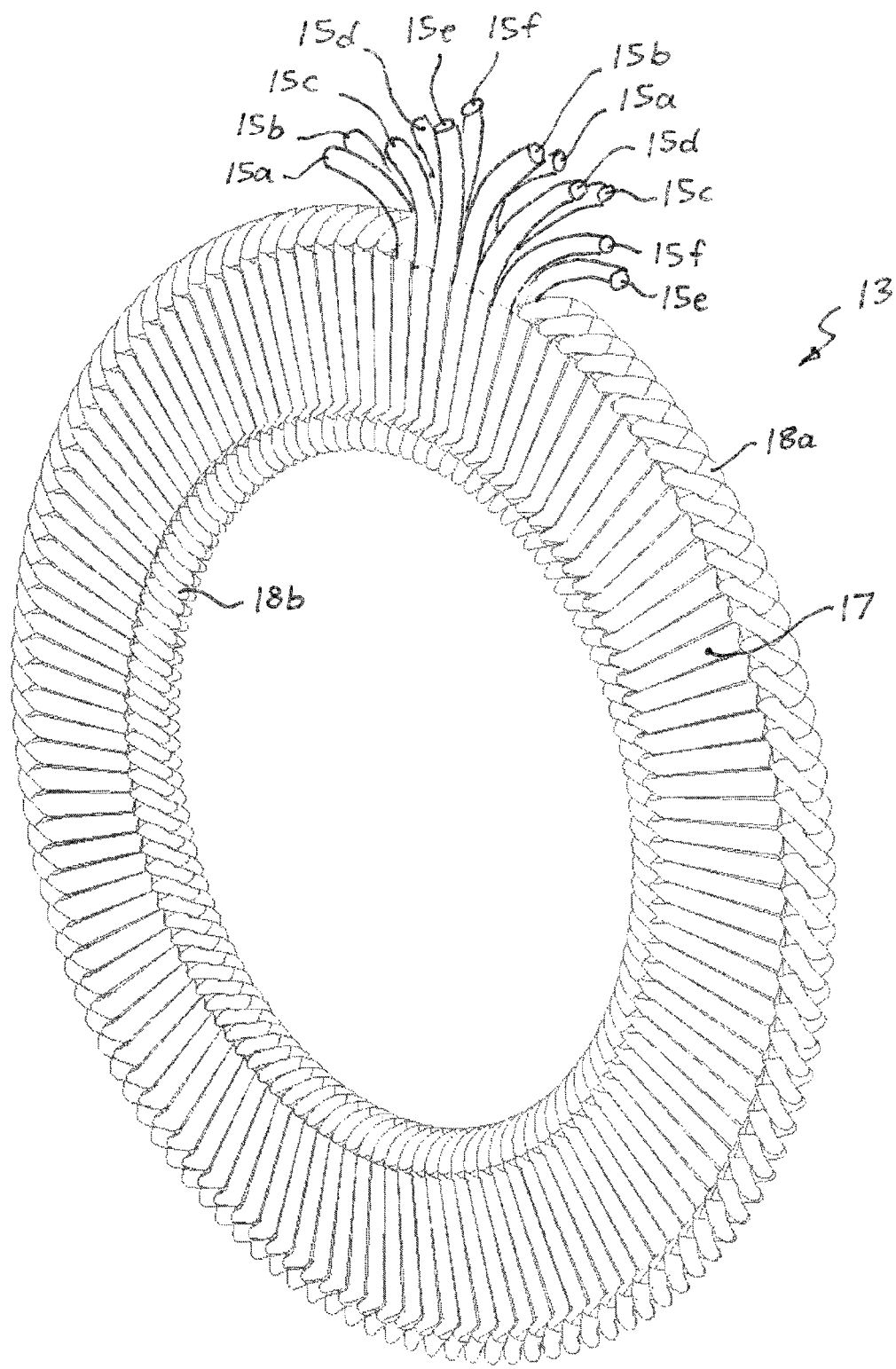
FIG. 2 shows the winding of the motor shown in FIG. 1.

The stator 2 is comprised of a wave pattern winding 13 bonded together by encapsulating it in a resin 14 to form a rigid structure. Referring to FIG. 2, winding 13 is made up of six wave shaped conductors 15a, 15b, 15c, 15d, 15e and 15f. Motor 1 is a 3-phase motor with the conductors 15a-f arranged as three pairs 15a and 15b, 15c and 15d, and 15e and 15f. Each pair of conductors is connected in series or parallel such that each pair of conductors is electrically in phase. Each conductor 15a-f makes one turn of the winding 13 such that all the conductors 15a-f enter and exit the winding 13 at approximately the same location on the outer circumference of the winding 13.

Figure 3:
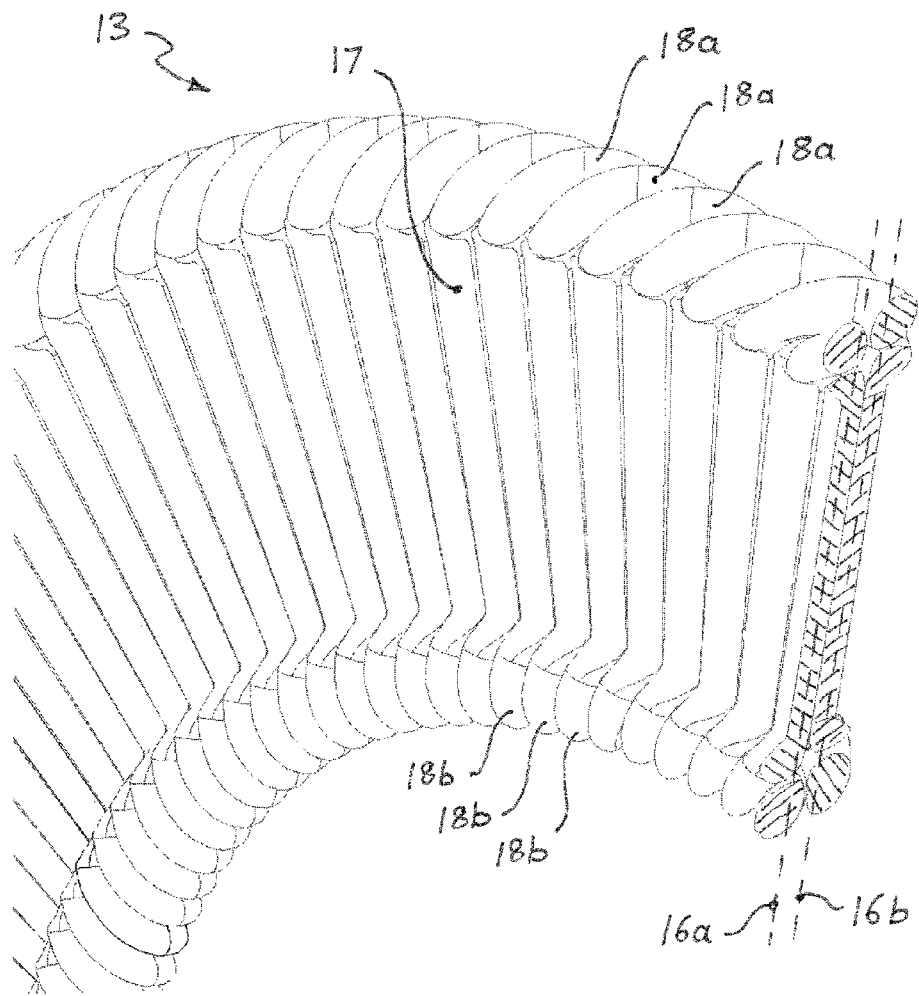
FIG. 3 is a sectioned view of the winding shown in FIG. 2.
Figure 4:
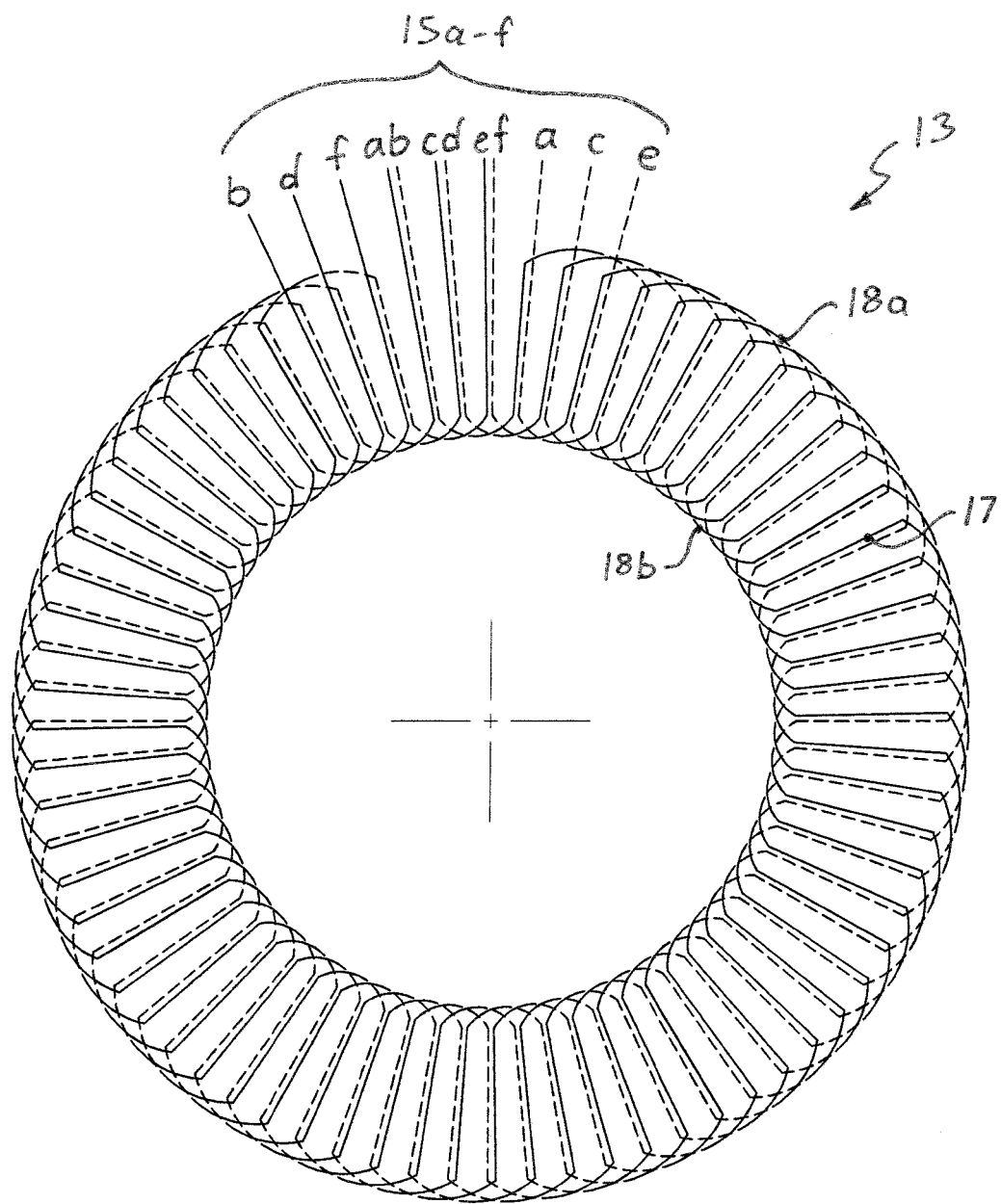
FIG. 4 schematically shows the wave pattern of the winding shown in FIG. 2.
Figure 5:
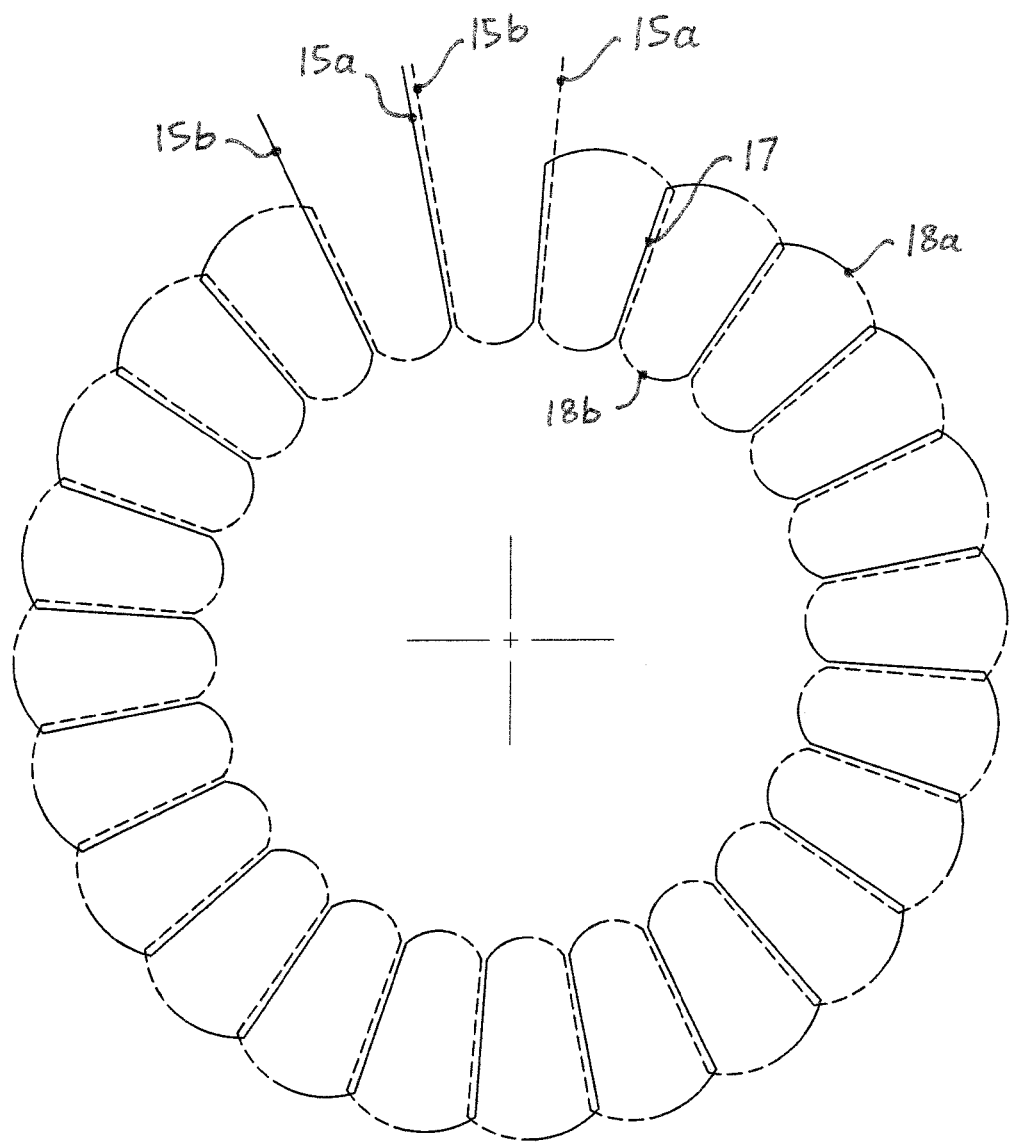
FIG. 5 schematically shows a pair of wave shaped conductors of the winding shown in FIG. 2.
Figure 6:
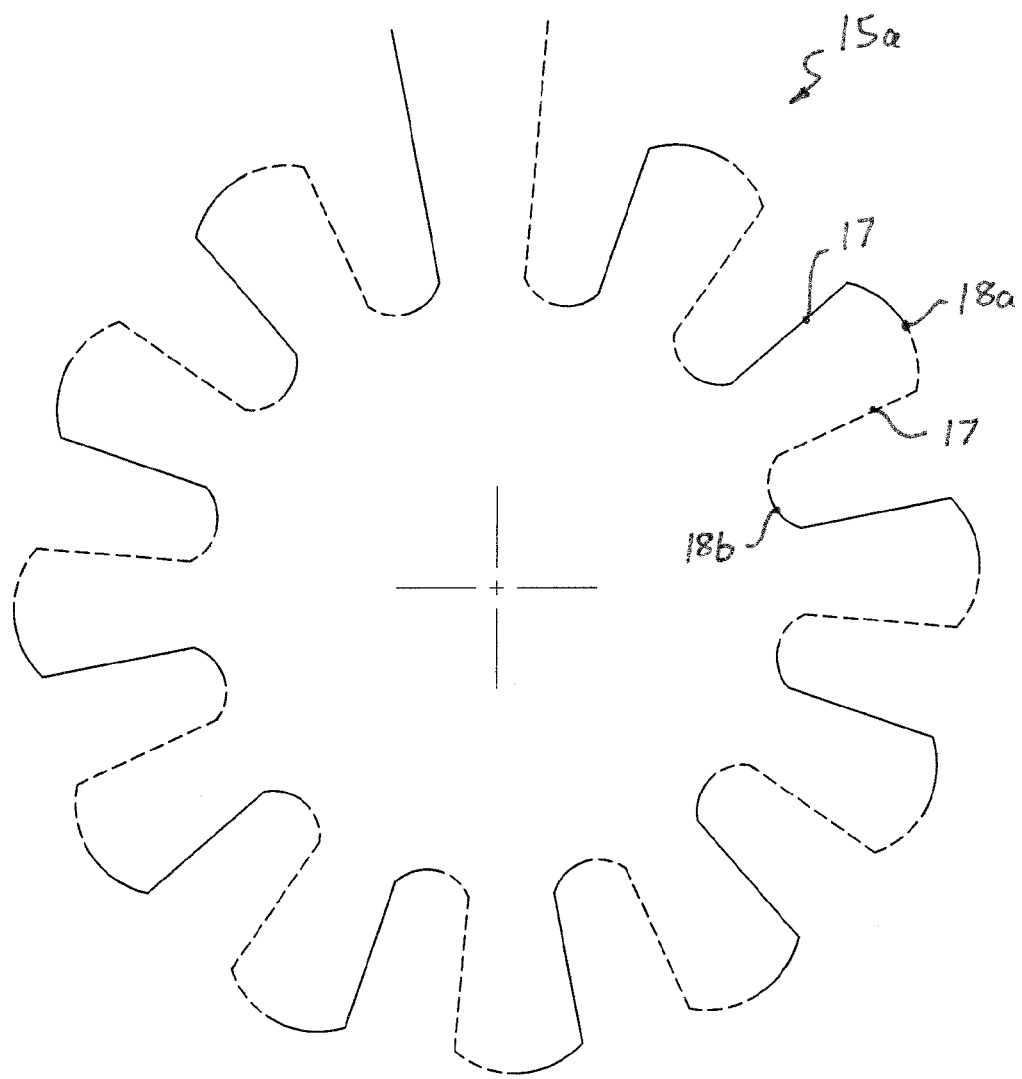
FIG. 6 schematically shows a single wave shaped conductor of the winding shown in FIG. 2.

As shown in FIG. 3, winding 13 has two layers 16a and 16b. FIG. 4 schematically shows how the wave pattern of winding 13 is arranged. Each conductor 15a-f is shown as a solid line when it is in the front layer 16a, and a dashed line when it is in the back layer 16b. FIG. 5 schematically shows a single pair of conductors 15a-b. Each conductor 15a-f has the same shape and FIG. 6 schematically shows the shape of a single conductor 15a. Conductor 15a has a wave shape, in that it never loops back on itself as it progresses around the winding 13, with radially extending legs 17 connected by end turns 18a and 18b. As conductor 15a progresses around winding 13, its legs 17 alternate between the two layers 16a and 16b. To clearly show how the wave pattern is arranged, in FIGS. 4 and 5 the legs 17 of each pair of conductors 15a-b, 15c-d and 15 e-f are schematically shown as slightly circumferentially offset from each other. In the actual winding 13, the legs 17 of each pair of conductors 15a-b, 15c-d and 15 e-f are circumferentially aligned with each other.

Figure 19:
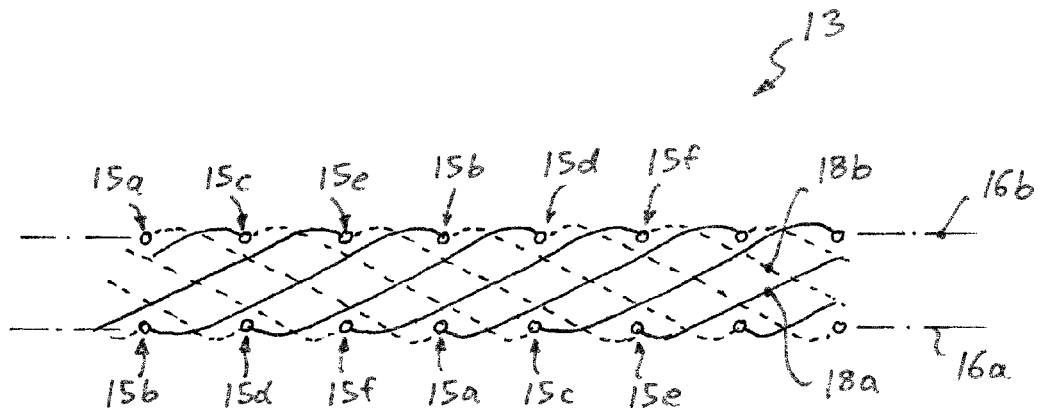
FIG. 19 is a schematic side view of the winding shown in FIG. 2.

FIG. 19 schematically shows a partial side view of winding 13. Referring to FIGS. 4, 5, 6 and 19, as each conductor 15a-f progresses clockwise around the winding 13, the outer end turns 18a always progress from the front layer 16a to the back layer 16b, and the inner end turns 18b always progress from the back layer 16b to the front layer 16a. As such all of the outer end turns 18a are skewed in the same direction with respect to the axis of the motor and never cross over each other. Likewise, all the inner end turns 18b are skewed in the same direction, opposite to that of the outer end turns 18a.

Figure 7:
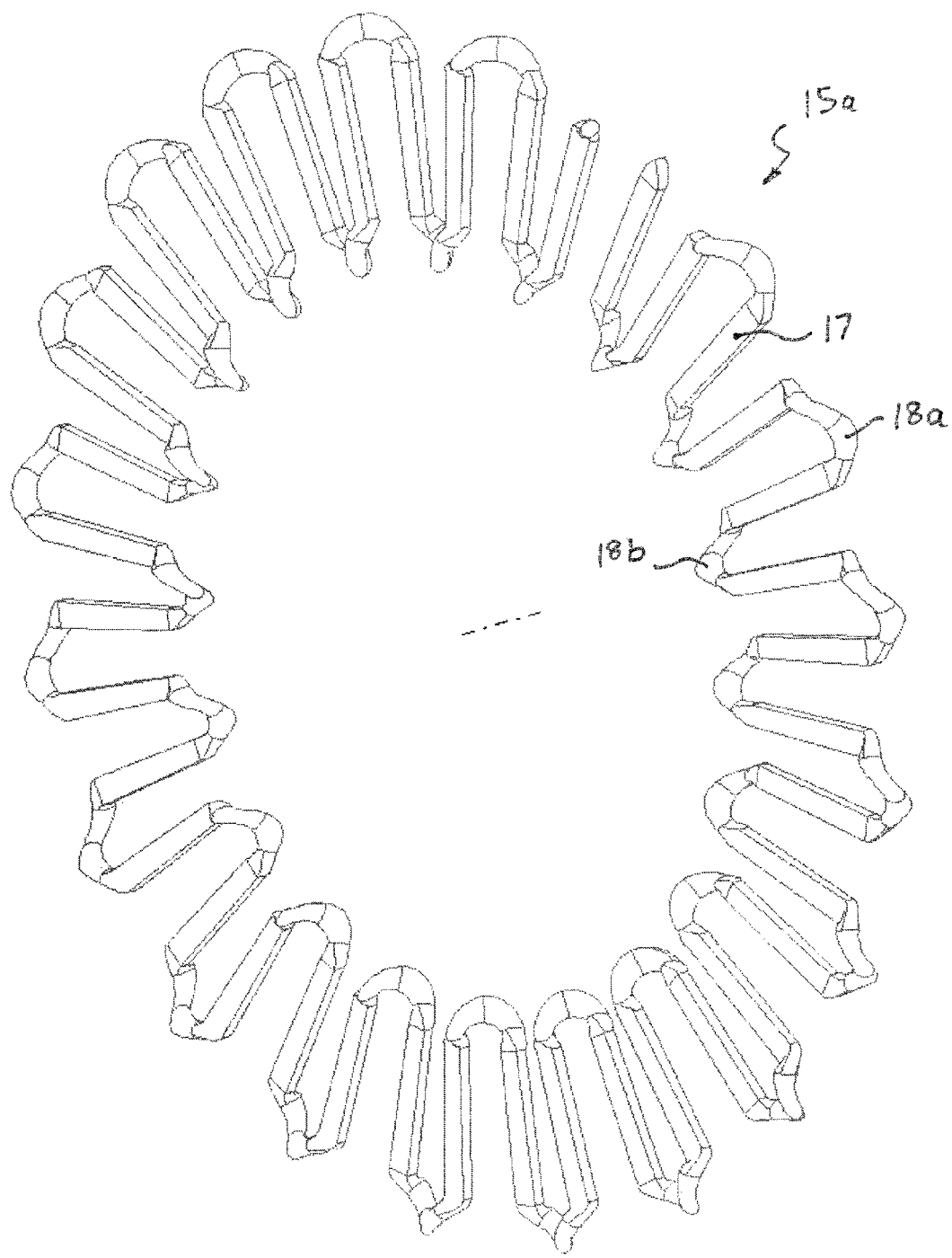
FIG. 7 shows a single wave shaped conductor of the winding shown in FIG. 2.
Figure 8:
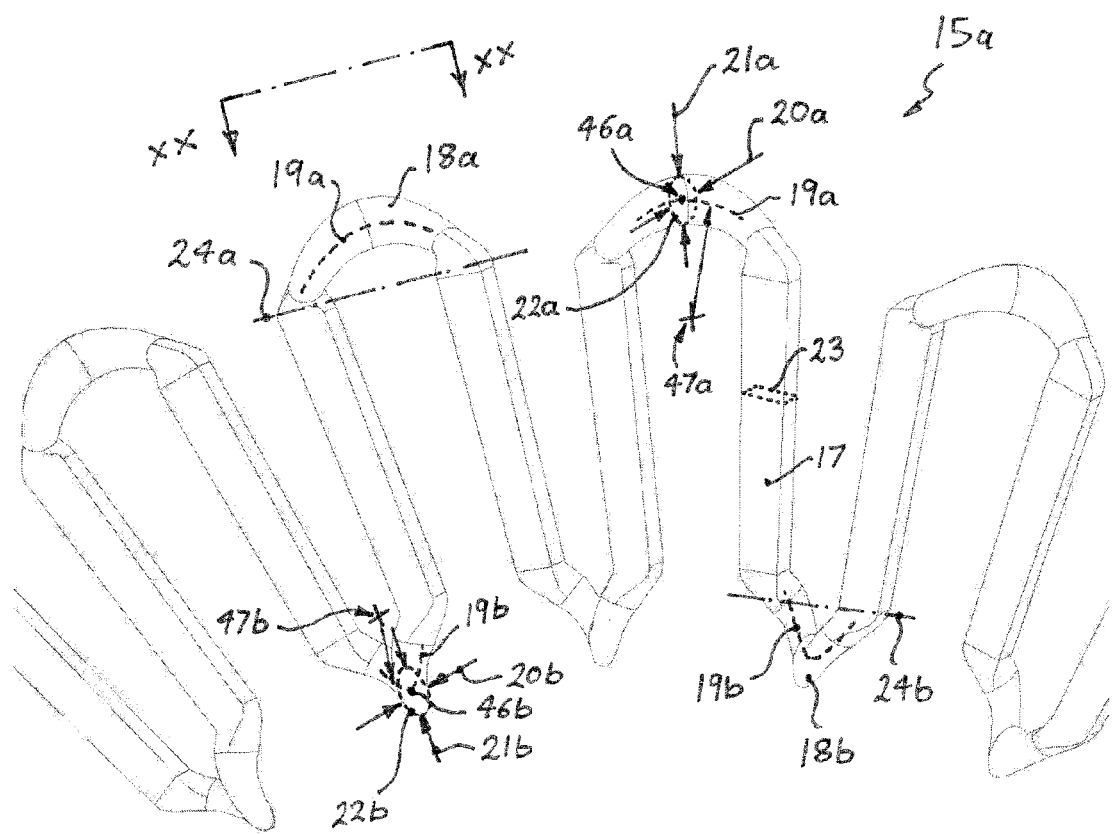
FIG. 8 is an enlarged view of part of the wave shaped conductor shown in FIG. 7.

FIGS. 7 and 8 show an actual wave shaped conductor 15a of winding 13. The remaining conductors 15b-f are the same shape as conductor 15a. Referring to FIG. 8, the legs 17 of conductor 15a have a rectangular cross section as indicated by the broken outline 23. The corners of the rectangular section are shown as being sharp for clarity of description. In practice the corners may be rounded with the cross sectional shape of legs 17 then being approximately rectangular. The use of a rectangular cross sectional shape of legs 17 results in winding 13 having a significantly higher fill factor, than if the winding was made with legs having a substantially circular cross section.

Figure 20:
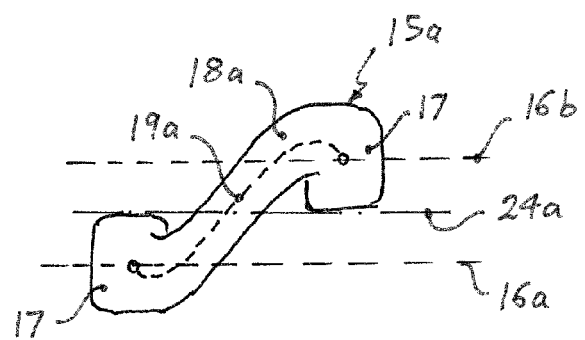
FIG. 20 is a side view of one outer end turn of the wave shaped conductor shown in FIG. 8, viewed along XX-XX of FIG. 8.

Referring to FIG. 8, each outer end turn 18a of conductor 15a is curved such that it follows a three dimensional curved path as indicated by broken line 19a. The curved path 19a is helical about axis 24a. FIG. 20 is a side view of one outer end turn 18a of conductor 15a, which shows that axis 24a is approximately parallel to, and mid way between layers 16a and 16b. Referring again to FIG. 8, similarly, each inner end turn 18b is curved such that it follows a three dimensional curved path as indicated by broken line 19b. The curved path 19b is helical about axis 24b. Axis 24b is also approximately parallel to, and mid way between layers 16a and 16b.

The end turns 18a and 18b are flattened as will be described by reference to the cross sectional shape at a single point on each end turn, as follows. Broken outline 22a shows the cross section of an outer end turn 18a at a single point 46a on the curved path 19a, viewed normal to the curved path 19a. Point 47a is the instantaneous centre of curvature of path 19a at point 46a. Reference numeral 21a indicates the thickness of cross section 22a in a radial direction with respect to the instantaneous centre of curvature 47a, and reference numeral 20a indicates the thickness in an axial direction with respect to centre 47a. The radial direction is defined by a line through points 46a and 47a, and the axial direction is defined as being perpendicular to the radial direction and to the tangent direction of path 19a at point 46a. Cross section 22a is approximately elliptical in shape such that its radial thickness 21a is thicker than its axial thickness 20a.

Similarly, broken outline 22b shows the cross section of an inner end turn 18b at a single point 46b on the curved path 19b, viewed normal to the curved path 19b. Point 47b is the instantaneous centre of curvature of path 19b at point 46b. Reference numeral 21b indicates the thickness of cross section 22b in a radial direction with respect to the instantaneous centre of curvature 47b, and reference numeral 20b indicates the thickness in an axial direction with respect to centre 47b. The radial direction is defined by a line through points 46b and 47b, and the axial direction is defined as being perpendicular to the radial direction and to the tangent direction of path 19b at point 46b. Cross section 22b is approximately elliptical in shape such that its radial thickness 21b is thicker than its axial thickness 20b.

The shape of the end turns 18a and 18b results in a compact end turn arrangement with relatively short end turns compared with other wave pattern windings. The helical path combined with the flattening of the end turns allows the end turns to closely nest together. Each end turn 18a, 18b must circumferentially overlap its adjacent end turns 18a, 18b for a significant proportion of its length, and the relatively small axial thickness 20a, 20b of the end turns 18a, 18b minimises the overall axial thickness of winding 13 at the end turns.

Figure 9:
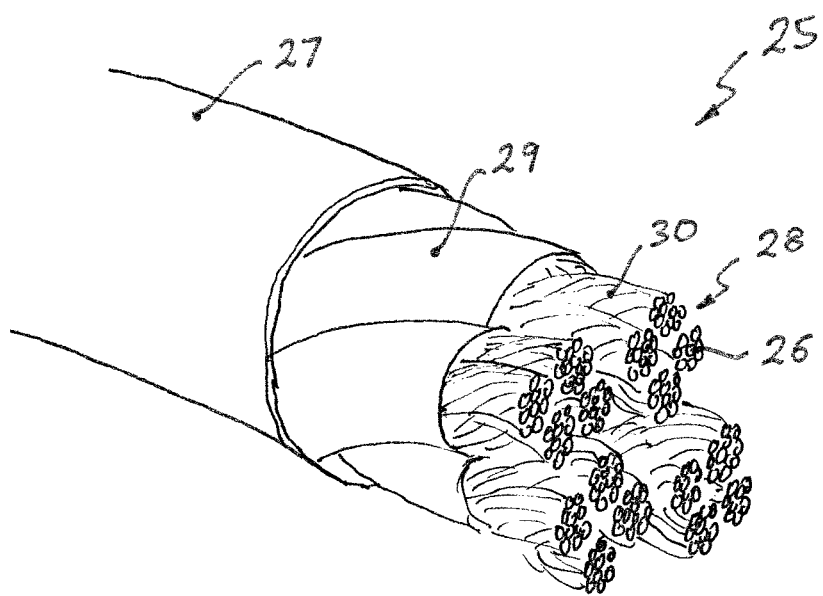
FIG. 9 is a sectional view of a length of Type-3 Litz wire.

The wave shaped conductors 15a-f are made from Type-3 Litz wire. FIG. 9 is a sectional view of a length of Type-3 Litz wire 25. Litz wire 25 has many copper wire strands 26 and an outer insulating layer 27 made from textile yarn, tape, or other suitable material. The wire strands 26 are arranged as multiple sub-bundles 28 twisted together, with each sub-bundle 28 having its own outer insulating layer 29. Each sub-bundle 28 is made up of multiple smaller sub-bundles 30 twisted together, with each smaller sub-bundle 30 being made up of multiple wire strands 26 twisted together. The wire strands 26 typically have a thin insulating coating, but it is necessary for the sub-bundles 28 to have outer insulating layers 29 to ensure they are electrically separated, as the thin insulating coating is easily broken. Litz wire is flexible, even though it may not fully spring back if bent sharply. Litz wire is usually supplied as a roll. As an example, the copper wire strands may have a diameter of 0.3 to 0.4 mm.

Figure 10:
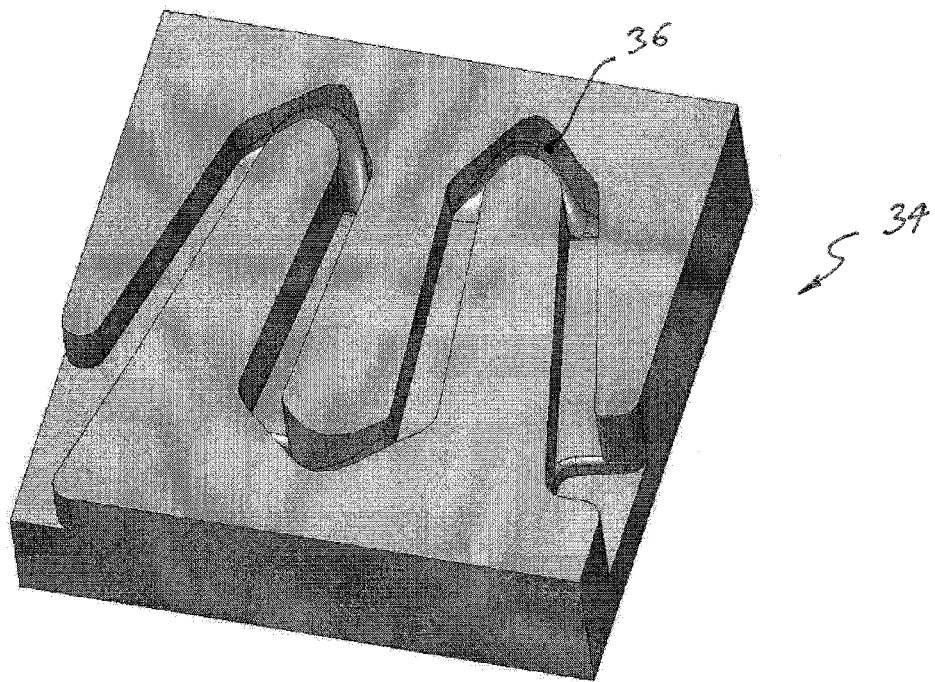
FIGS. 10 and 11 show two halves of a die set used to preform the conductors of the winding shown in FIG. 2.
Figure 11:
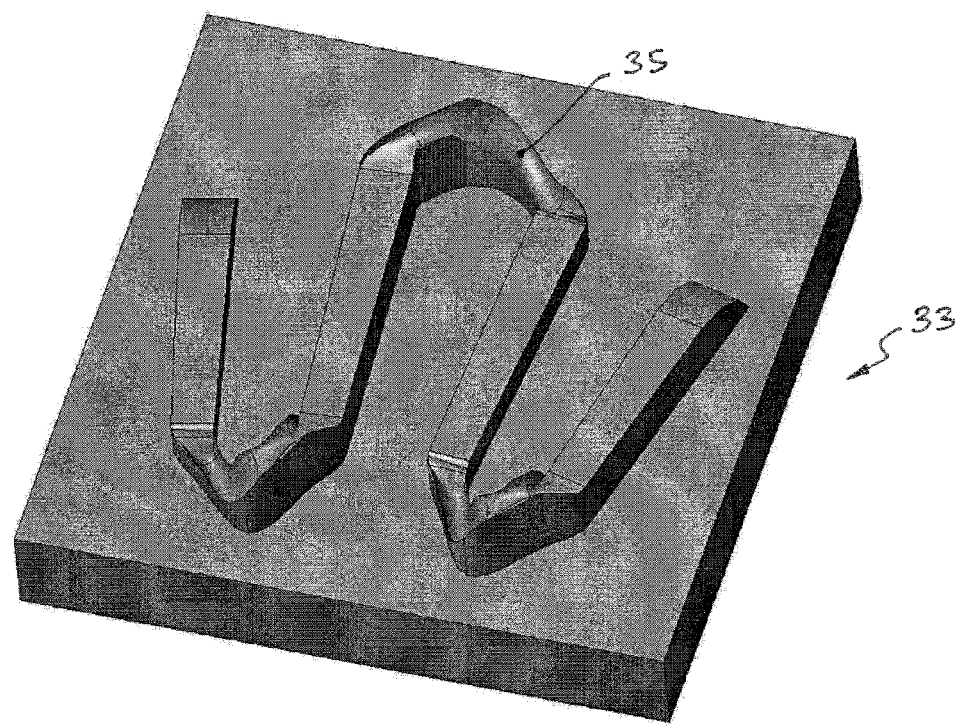

FIGS. 10 and 11 show two halves 33, 34 of a die set used to preform the wave shaped conductors 15a-f from Type-3 Litz wire 25. One half 33 of the die set has a punch 35 and the other half 34 has a cavity 36. When the die sets halves 33 and 34 are placed together there is a gap between the punch 35 and the cavity 36 that has the shape of four legs 17, two inner end turns 18b, and one outer end turn 18a of a conductor 15a-f.

Figure 12:
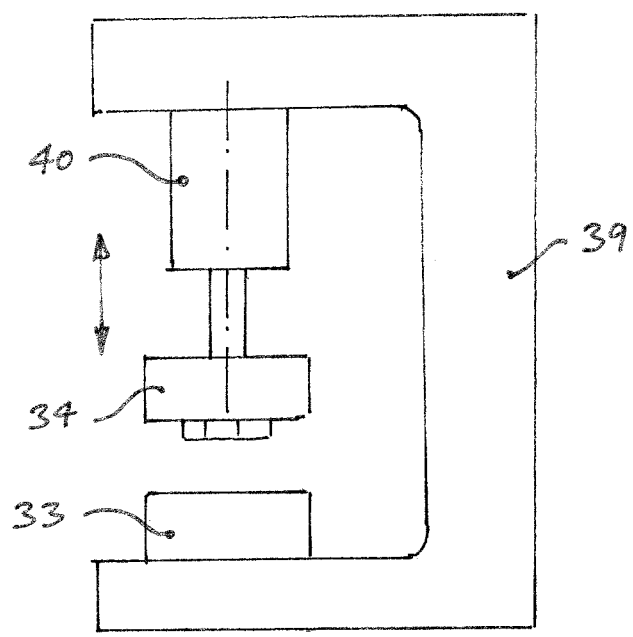
FIG. 12 shows the die set of FIGS. 10 and 11 mounted in a press.
Figure 13:
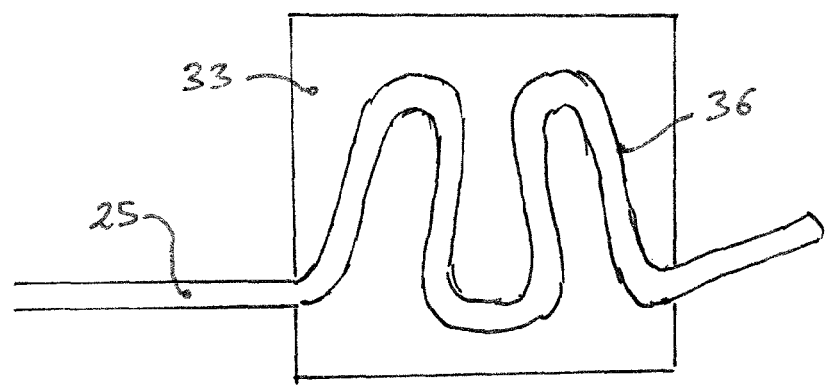
FIGS. 13 and 14 show how Litz wire is incrementally fed through the die set of FIGS. 10 and 11 to preform the wave shaped conductor shown in FIG. 7.
Figure 14:
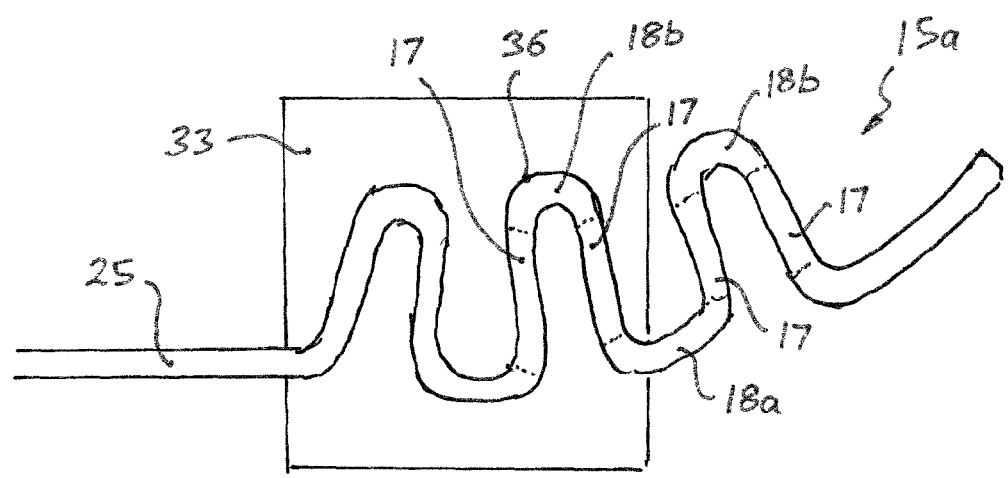

FIG. 12 shows the die halves 33, 34 mounted in a simple press 39 that has a cylinder 40 to open and close the die set. FIGS. 13 and 14 show how Litz wire 25 is incrementally fed through the die halves 33, 34 to preform the wave shaped conductor 15a. Referring to FIG. 13, a portion of the Litz wire 25 is bent and placed in the die cavity 36. The die halves 33, 34 are then closed and pressurised together by cylinder 40 such that the original substantially circular cross section of the portion of the Litz wire 25 in the cavity 36 is deformed and compacted to preform a portion of the wave shaped conductor 15a. Referring to FIG. 14, the Litz wire 25 is then incremented through the die cavity 36 to preform the next portion of the wave shaped conductor 15a. Even though the die cavity 36 extends for approximately two wavelengths of the wave shaped conductor 15a, the Litz wire 25 is only incremented by one wavelength between pressings to ensure correct spacing of the wave shape.

Figure 15:
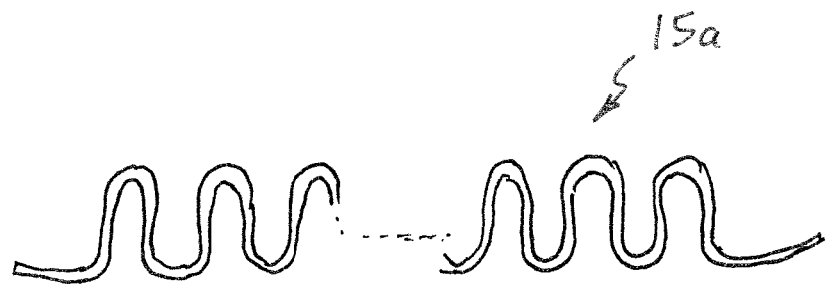
FIG. 15 shows the wave shaped conductor of FIG. 7 laid out straight.

As a result of pressing the Litz wire 25 as it is preformed into a wave shape, the wave shape of conductor 15a is substantially self supporting in that it will maintain its wave shape without needing to be supported, as it is handled. The die cavity 36 and punch 34 are shaped to curve the conductor 15a as it is preformed, with a radius equal to that of the final winding 13. However, the self supporting preformed wave shaped conductor 15a is still flexible to an extent that it can be laid out straight as shown in FIG. 15.

To avoid the Litz wire 25 springing back after pressing, significant compaction pressure is required to permanently compact and deform the Litz wire 25 into the shape of the rectangular sectioned legs 17 and the arcuate end turns 18a and 18b. However, the compaction pressure should not be excessive or the Litz wire 25 may be damaged. As an example, a compaction pressure of the order of 10 MPa may be used.

The process of incrementally feeding the Litz wire 25 through the die set 33, 34 may be automated. In other not shown embodiments of the invention, a die set may be used that is large enough to preform the entire length of a wave shaped conductor in one pressing. Alternatively, the wave shaped conductors may be preformed by using rollers or a machine similar to a CNC spring bending machine to press the Litz wire.

Figure 16:
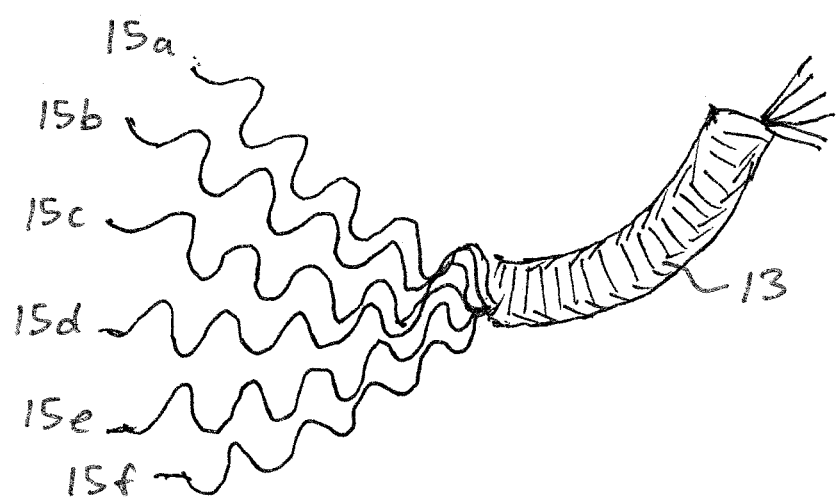
FIG. 16 shows the wave shaped conductors being weaved together to form the winding shown in FIG. 2.

To manufacture the complete winding 13, the six identical wave shaped conductors 15a-f are individually preformed as described above. The conductors 15a-f are then progressively woven together as shown in FIG. 16. This is made possible by the conductors 15a-f retaining a degree of flexibility after they are preformed. Optionally, one or more threads may also be woven into the winding 13 to assist with tying the winding 13 together.

The winding 13 is then placed in a mould (not shown). A vacuum is applied to the mould and resin 14 is pressurised into the winding 13 to encapsulate it and bond it together, thereby forming the stator 2. The mould may have several pegs that protrude into the gaps between the conductor legs 17 to ensure that the conductors 15a-f are properly circumferentially aligned. Optionally, the winding 13 may be pressed after it is placed in the mould to further compact it.

Winding 13 has a high fill factor compared with other known windings made from Litz wire, such as the motor disclosed in the above referenced paper "Design of an in-wheel motor for a solar-powered electric vehicle", primarily due to the rectangular cross section of the legs 17 of the wave shaped conductors 15a-f, and the compaction of the Litz wire 25 as it is pressed in the die set 33, 34. The fill factor of a winding manufactured as described above will typically be in the range of 40% to 70%.

Windings in accordance with the present invention may be made from multi-strand conductors other than Litz wire. However, an advantage of using conductors made from Litz wire compared with using a conductor with multiple wire strands that are not twisted together, is that the twisted arrangement of the Litz wire means that each wire strand is near the surface of the conductor at various points along its length, allowing it to conduct heat to the surface of the conductor at those points. The overall thermal performance of the winding is therefore improved.

An advantage of using conductors made from Type-3 Litz wire 25 rather than Type-1 or Type-2 Litz wire is that the insulated sub-bundles 28 can be connected in series. This means that a single turn of Type-3 Litz wire 25 around the winding can provide multiple electrical turns, and therefore it is not necessary to have multiple physical turns of a conductor to provide multiple electrical turns, which makes the winding easier to manufacture. Furthermore, it is possible to actively switch the connection of the sub-bundles 29 between series and parallel.

Figure 17:
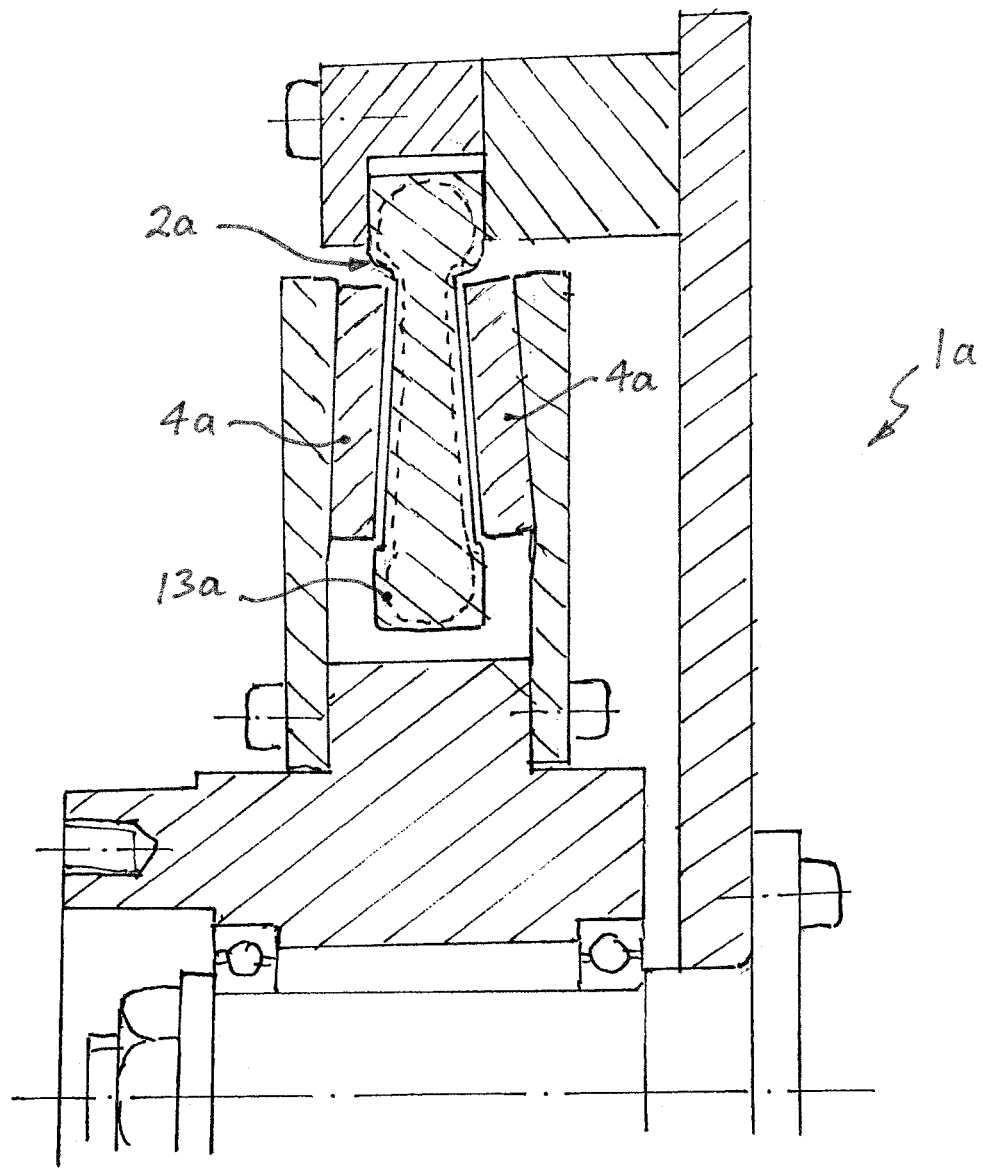
FIG. 17 is a cross sectional view of a second embodiment of an axial flux electric motor, having a tapered ironless stator winding, in accordance with the present invention, manufactured by a method in accordance with the present invention.

FIG. 17 shows a second embodiment of an axial flux electric motor 1a in accordance with the present invention. Motor 1a is the same as motor 1 shown in FIG. 1 except that the stator 2a and its winding 13a are tapered such that the active portion of the winding 13a in the axial gap between magnets 4a becomes thinner as the radius increases. The magnet sets 4a have a corresponding conical shape such that the same small gap is maintained between the magnets 4a and the stator 2a as the radius varies.

Figure 18:
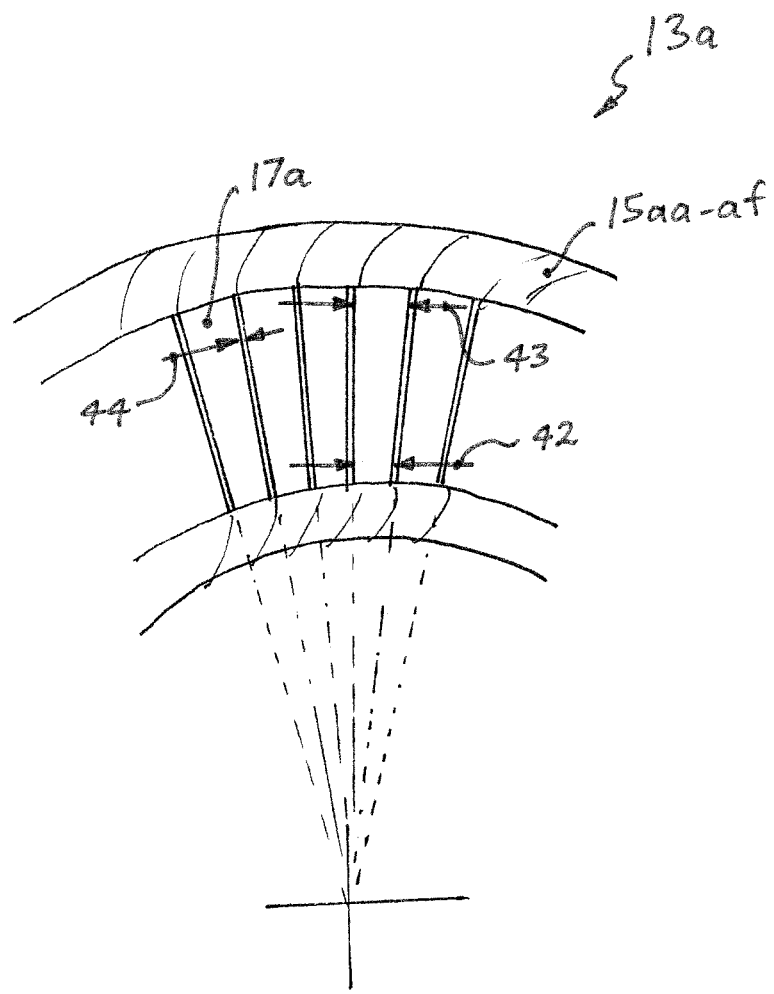
FIG. 18 is a partial side view of the winding of the motor shown in FIG. 17.

Referring to FIG. 18, the legs 17a of each wave shaped conductor 15aa-af of winding 13a are tapered in the plane of the wave shape of conductors 15aa-af such that they become thinner as the radius decreases. This is illustrated by the thickness indicated by reference numeral 42 being less than the thickness indicated by reference numeral 43.

Reference numeral 44 indicates the gaps between adjacent legs 17a. The taper of the legs 17a in the plane of the wave shaped conductors 15aa-15af minimises the gaps 44 between the legs 17a. As shown in FIG. 18, the gap 44 does not vary with the radial distance from the centre of the winding 13a, and in practice the adjacent legs 17a may contact each other such that there is no gap. In contrast, if the legs have a constant thickness, such as legs 17 of motor 1 described above, then the gap between the legs will increase as radial distance from the centre of the winding increases. This minimisation of the gaps 44 between the legs 17a provided by the tapering further improves the fill factor.

Like the motor shown in FIG. 1, the wave shaped conductors 15aa-af of motor 1a are made from Type-3 Litz wire 25. The substantially constant cross sectional area of Litz wire 25 results in the Legs 17a also tapering in a direction transverse to the wave shape such that they become thinner as the radius increases, thus resulting in the tapering of the stator 2a and winding 13a shown in FIG. 17.

The winding 13a is manufactured using the same method as described for motor 1 above. The only difference is that the punch 35 and cavity 36 of the die set 33, 34 are shaped differently to preform the tapered shape of legs 17a.

Whilst the present invention is primarily directed to the manufacture of ironless windings, it is also applicable to windings having flux concentrators. These flux concentrators are made from a ferro-magnetic material, such as iron, and can be placed in the gaps between the legs of the wave shaped conductors after they have been weaved together, but before bonding the winding. Metglass may also be used for the flux concentrators.

Figure 21:
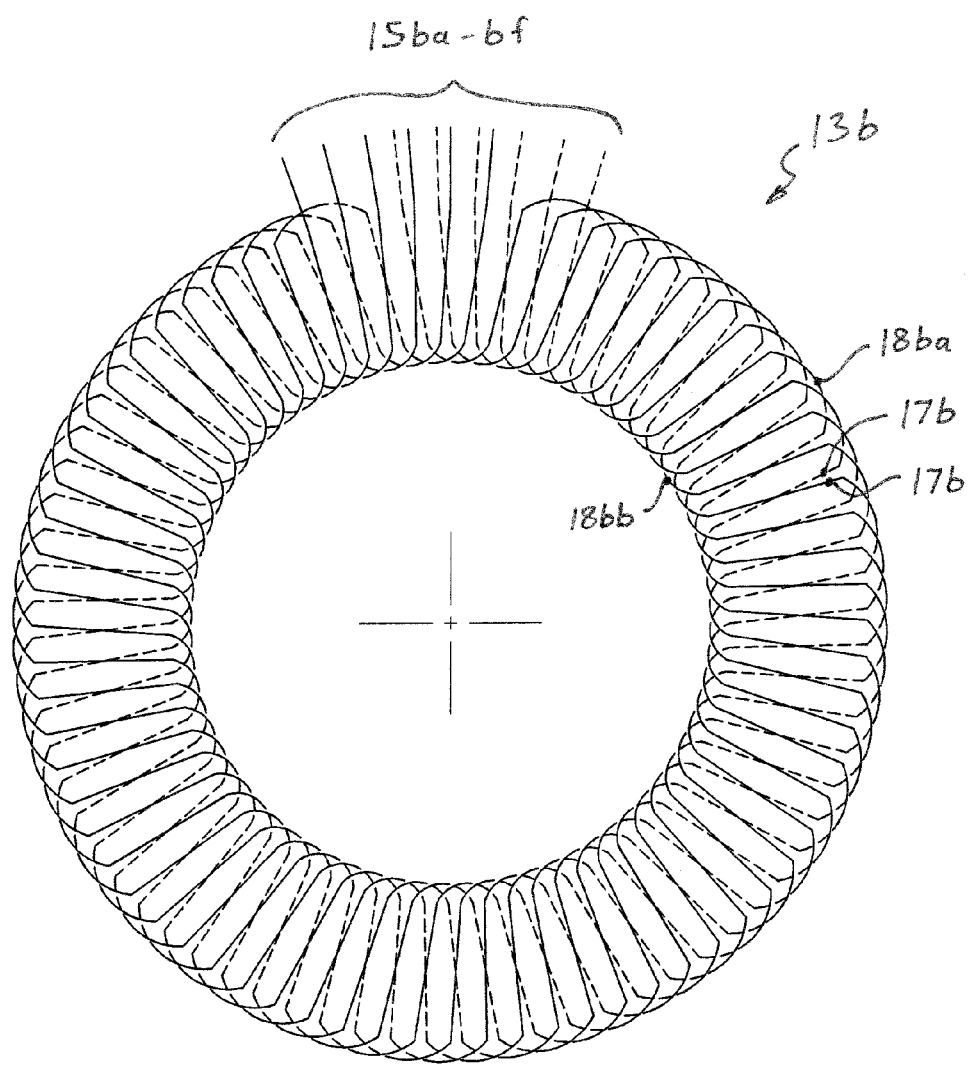
FIG. 21 schematically shows a wave pattern winding arrangement in accordance with the present invention in which the legs of the conductors are skewed to the radial direction.

Whilst the embodiments of the axial flux motor described above have windings in which the legs of the wave shaped conductors are radially oriented with respect to the centre of the winding, other not shown embodiments may have windings in which the conductor legs are skewed to the radial direction. In this case, each pair of conductor legs will tend to cross each other as viewed in the plane of the winding, however each pair of legs can still be considered as being circumferentially aligned together. This alternative winding arrangement is schematically shown in FIG. 21. FIG. 21 shows a wave pattern winding 13b, in a similar manner to FIG. 4. The legs 17b of each conductor 15ba to 15bf are skewed to the radial direction, and the legs 17b of each pair of conductors 15ba and 15bb, 15bc and 15bd, and 15be and 15bf cross over each other. The performance of the winding 13b is reduced by having the legs 17b of the conductors 15ba to 15bf skewed but this is compensated for by the resulting reduced length of the end turns 18ba, 18bb, compared with the arrangement shown in FIG. 4.

Figure 22:
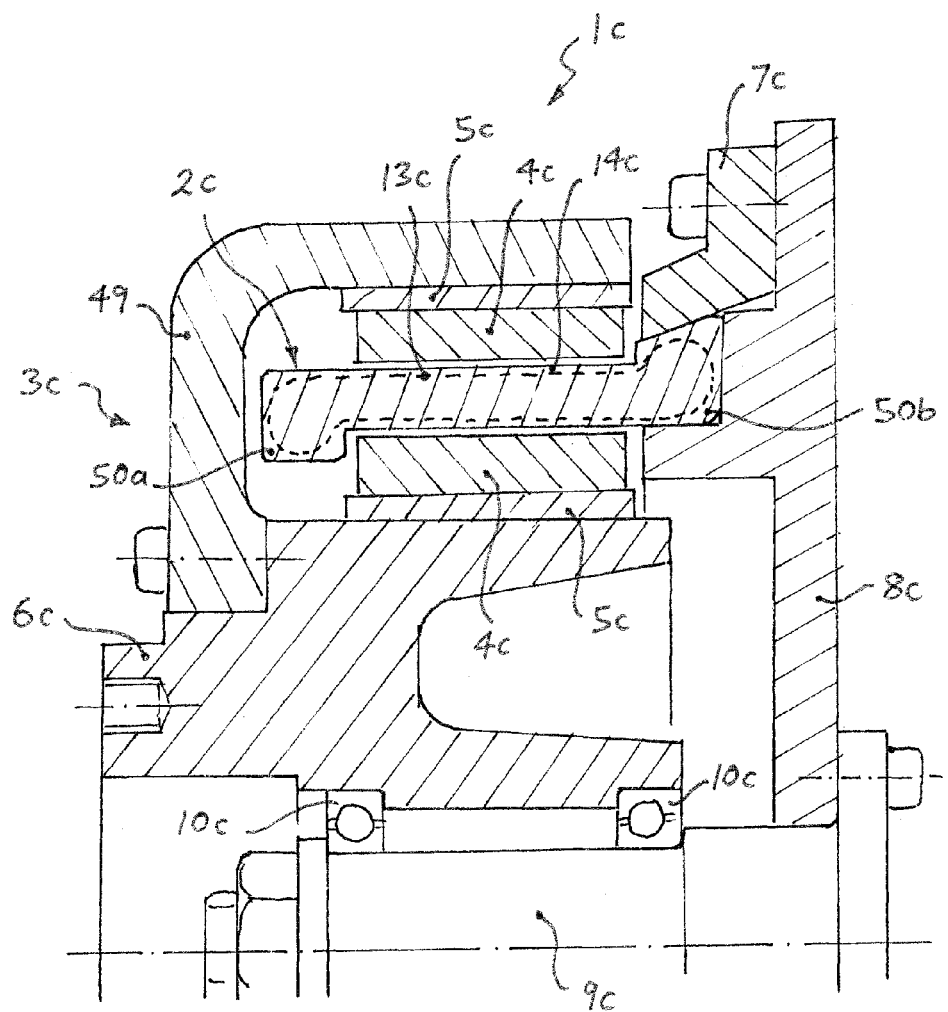
FIG. 22 is a cross sectional view of a radial flux electric motor, having an ironless stator winding, in accordance with the present invention, manufactured by a method in accordance with the present invention.

FIG. 22 is a cross sectional view of a radial flux electric motor 1c, comprising a cylindrical ironless stator 2c positioned between two cylindrical sets of permanent magnets 4c that are mounted on backing cylinders 5c. The inner backing cylinder 5c is mounted on a hub 6c, and the outer backing cylinder 5c is mounted on a separate carrier 49 that is bolted to the hub 6c. Magnets 4c, backing plates 5c, hub 6c and carrier 49 make up the rotor 3c of motor 1c. The hub 6c is supported for rotation around stub axle 9c by bearings 10c. The stub axle 9c is attached to the motor housing 8c, and the stator 2c is attached to the housing 8c by a clamp plate 7c. Motor 1c can be used as a direct drive wheel motor for a vehicle by attaching the motor housing 8c to the suspension of the vehicle, and mounting a wheel onto the motor hub 6c. The stator 2c is comprised of a wave pattern winding 13c bonded together by encapsulating it in a resin 14c to form a rigid structure.

The cylindrical wave pattern winding 13c is similar in construction to the disc shaped winding 13 shown in FIG. 2. Winding 13c is comprised of six wave shaped conductors that are preformed and woven together in the same manner as winding 13, to form a winding pattern having two cylindrical layers. The end turn regions 50a and 50b of the stator 2c must be thicker than the active region of the stator 2c, between the magnets 4c, to accommodate the additional radial thickness at the end turns of the winding 13c. To allow assembly of motor 1c, end turn region 50a is biased radially inwards, and end turn region 50b is biased radially outwards. The end turns of the wave shaped conductors used to make up winding 13c are preformed into a three dimensional curved shape to suit this biasing of the end turn regions 50a, 50b. Motor 1c is assembled by fitting the hub 6c, with the inner set of magnets 4c attached, onto the stub axle 9c, then sliding the stator 2c over the inner set of magnets 4c and clamping it to the housing 8c. Then, the carrier 49, with the outer set of magnets 4c attached, is slid over the stator 2c and bolted to the hub 6c.

In other not shown embodiments of the invention, Litz wire with a heat bondable coating may be used so that the winding arrangement can be bonded together prior to final encapsulation in resin.

In other not shown embodiments of the invention, the winding may be bonded by methods other than using a vacuum mould to encapsulate it in a resin. For example, the winding may be bonded and encapsulated by injection moulding. Materials other than resin may also be used, such as thermoplastics or polyurethane.

In other not shown embodiments of the invention, two preformed wave shaped conductors may be formed on the one continuous length of Litz wire. This may reduce the number of connections that need to be made at the ends of the wave shaped conductors.

The term "comprising" as used herein is used in the inclusive sense of "including" or "having" and not in the exclusive sense of "consisting only of".

The invention claimed is:

1. A wave winding for an ironless core electrical machine, comprising at least one conductor, the conductor comprising multiple strands of wire and an outer insulating layer, and having a wave shape that progresses around the winding comprising a plurality of legs connected by end turns, with at least a portion of at least one end turn following a curved path, wherein the cross section of the end turn at least at one point on the curved path, viewed normal to the curved path, is thicker in a radial direction than an axial direction, the radial and axial directions being with respect to the instantaneous center of curvature of the curved path at the point the end turn flattens with respect to the legs to form said cross section, and that the curved path combined with flattening of the end turn relative to the legs allows the end turn of the conductor to be nested with the end turn of a like conductor.

2. A winding for an electrical machine as claimed in claim 1 wherein the curved path is three dimensional.

3. A winding for an electrical machine as claimed in claim 2 wherein the curved path is helical.

4. A winding for an electrical machine as claimed in claim 1 wherein the cross sectional shape of at least one of the legs is approximately rectangular.

5. A winding for an electrical machine as claimed in claim 1 wherein the at least one conductor comprises two or more conductors arranged in a wave pattern.

6. A winding for an electrical machine as claimed in claim 5 wherein the wave pattern has two layers and the at least one conductor comprises at least one pair of conductors, the legs of each pair of conductors being aligned together or skewed to each other at an included acute angle of up to 60 degrees, the legs of each conductor alternating between the two layers with the end turns at each side of the winding being skewed in substantially the same direction such that the end turns do not cross over each other.

7. A winding for an electrical machine as claimed in claim 1 wherein the electrical machine is an axial flux electrical machine, and the winding is tapered such that the active portion of the winding becomes thinner as the radius of the winding increases.

8. A winding for an electrical machine as claimed in claim 7 wherein at least one of the legs of the conductor is tapered such that it becomes thinner in the plane of the wave shape as the radius of the winding decreases.

9. A winding for an electrical machine as claimed in claim 1 wherein the conductor is continuous for at least one complete turn of the electrical machine.

10. A winding for an electrical machine as claimed in claim 1 wherein the multiple strands of wire of the conductor comprise at least two sub-bundles of twisted wire strands, each sub-bundle having an outer insulating layer.

11. A winding for an electrical machine as claimed in claim 1, wherein the electrical machine is any one of a radial flux machine or a conical flux machine.

* * * * *